United States Patent [19]

Lawrence et al.

[11] 4,112,035

[45] Sep. 5, 1978

[54] PRODUCTION OF CALCINABLE MATERIAL

[75] Inventors: Leslie John Lawrence, Middlesbrough; Denis Ansbro, Stockton-on Tees, both of England

[73] Assignee: Tioxide Group Limited, Billingham, England

[21] Appl. No.: 796,003

[22] Filed: May 11, 1977

[30] Foreign Application Priority Data

Jun. 11, 1976 [GB] United Kingdom ............... 24203/76

[51] Int. Cl.$^2$ .............................................. B01J 2/10
[52] U.S. Cl. ..................................... 264/113; 264/117
[58] Field of Search ................................ 264/113, 117

[56] References Cited

U.S. PATENT DOCUMENTS

| 3,793,841 | 2/1974 | Dozsa | 264/117 |
| 3,956,445 | 5/1976 | Hunt | 264/117 |

*Primary Examiner*—Robert F. White
*Assistant Examiner*—James R. Hall
*Attorney, Agent, or Firm*—Schuyler, Birch, Swindler, McKie & Beckett

[57] ABSTRACT

Pelletizing damp gypsum to render the gypsum easily calcinable by a process in which the damp gypsum is agitated, and when moisture is observed at the surface of the forming pellets a dry powdered compound of calcium is added until the forming pellets are coated with the powdered compound to become free-flowing.

8 Claims, No Drawings

PRODUCTION OF CALCINABLE MATERIAL

This invention relates to the production of calcinable material and particularly to the production of gypsum in an easily calcinable form.

According to the present invention a process for the production of calcinable gypsum comprises agitating damp gypsum to form pellets, and when moisture is observed at the surface of the forming pellets, adding thereto a substantially dry powdered compound of calcium until the forming pellets are coated with the powdered compound and are free-flowing.

Impure aqueous sulphuric acid solutions containing iron sulphates are produced in large quantities by the steel industry "as pickling liquor" and by the titanium dioxide industry in the operation of the so-called "sulphate" process.

It is desirable that such aqueous sulphuric acid solutions should be treated to reduce their acidity prior to disposal of the hitherto waste materials. Gypsum produced by the neutralisation of such solutions with a basic calcium compound can be used as a source of sulphur dioxide which is produced by calcination, but difficulties have arisen in the calcination of gypsum.

The calcination process for gypsum has resulted in the sintering of the feed, a large part of gypsum fed to the calciner has been lost from the calciner as a fine suspension in the gases passed from the calciner and material adheres to the walls of the calciner.

It has now been discovered that these disadvantages are substantially reduced, if not eliminated, by the pelletisation of gypsum according to the process of the present invention prior to calcination.

Essentially, in the process of the present invention, damp gypsum is agitated. This agitation has the effect of forming the damp gypsum into small spheres or pellets, during which formation the moisture contained within the damp gypsum exudes to the surface of the forming pellets. This process is known as glistening. Surprisingly, it has been found that when a substantially dry powdered compound of calcium is then added to these forming spheres, or pellets, the powder coats the forming pellets and maintains them in free-flowing form. On subsequent calcination of the pellets there is no apparent sintering and very little loss of gypsum from the calciner in the form of fine particles within the exit gas stream. The majority of gypsum is oxidised to calcium oxide and sulphur dioxide recovered from the exit gas stream is converted, if desired, into sulphuric acid.

The process of the present invention is of particular use when the damp gypsum contains from 15 to 25 weight percent of water. The use of gypsum in this form minimises any previous drying which may be necessary in the process for the manufacture of gypsum. Preferably, the damp gypsum contains from 18 to 22 weight percent of water. Usually when the gypsum is to be calcined it is advisable to mix with the gypsum a supply of carbonaceous reducing agent, such as coke. The amount of coke mixed with the damp gypsum will usually be from 2 to 8 percent by weight of damp gypsum.

The gypsum to be treated according to the present invention may be that obtained in the precipitation stages of our U.S. Pat. No. 4,006,080.

The dry powdered compound of calcium which is added may be calcium carbonate, calcium sulphate hemi-hydrate, calcium oxide, calcium sulphide or partly calcined calcium sulphate. Preferably the dry powdered calcium compound is dry gypsum. By the term "dry powdered compound of calcium" there is meant a compound of calcium which contains less than 2.5 percent by weight of free water. Usually the powdered compound will contain less than 1 percent by weight of free water.

The substantially dry gypsum may be obtained by any suitable process, such as by the spray-drying of wet gypsum.

The damp gypsum can be agitated in any suitable vessel, but preferably the vessel is equipped with an internal stirrer or scraper, and one form of mixer which has produced satisfactory pelletisation is a horizontal pan-shaped vessel equipped with an internal offset paddle and scraper bar, such as that commonly employed for mixing concrete or mortar in the building industry. Alternatively, a horizontal cylindrical trundler may be employed.

The process of the invention for the production of calcinable gpysum is particularly suitable for operation as a continuous process in which there is fed into one end of the horizontal trundler mounted on rollers, a supply of damp gypsum, and at the chosen position along the length of the trundler dry gypsum is added to form the coated pellets which issue from the other end of the trundler.

The amount of dry compound of calcium added during pelletisation depends on the amount of water present in the original damp gypsum to be pelletised. For instance, when damp gypsum is employed containing 20% by weight free water then it has been found that one part by weight of dry gypsum ($CaSO_4$ 1.9 $H_2O$) is required for each three to four parts of the damp gypsum. The pellets contain from 12 to 15% by weight free water when produced by the process of the present invention from damp gypsum containing 20% free water. The pellets remain unchanged on storage but are hardened on drying and remain practically unchanged in appearance after calcination in a calciner at 950° C. for 1½ hours.

The invention is illustrated in the following Example.

EXAMPLE

Acidic waste from the sulphate process in the manufacture of titanium dioxide was neutralised with limestone slurry in a continuous operation to pH 2 with the evolved $CO_2$ being recovered for maximum economy. The precipitated gypsum was removed by centrifuging and briefly washed to give a discharge consisting of 80.7% gpysum and less than 0.15% Fe, the remainder being substantially free uncombined water.

The damp friable solid was blended with coke (amounting to 5% on the weight of gypsum), in a mixer/fluffer machine. One portion was kept for rotary calcination in a gas fired kiln and the remainder was pelletised in a horizontal pan-mixer. Dry gypsum (previously dried in a ventilated tray drier at 70° C.) amounting to 21.5% by weight of the gypsum in the damp charge together with the necessary coke adjustment was slowly sprinkled onto the surface of the glistening gypsum spheres which occurred after 8 minutes mixing. The addition took 3 minutes to complete after which time the spheres were uniformly coated, and although still plastic (i.e. deformable and not brittle) were suitable for feeding to the calciner. A portion of the pellets was dried and stored in bags for two weeks before calcination.

The results of calcining these three materials at 1185° C. to 1235° C. are tabulated. While there was no significant difference in the chemical decomposition of the gypsum in these examples, calcination conditions not having been optimised for these particular experiments, the losses from the kiln are enormous for the unpelletised feed sufficient to make the operations unworkable while dusting losses and sticking are minimal for the granulated feeds. The breakdown occurring during calcination of the unpelletised feed is further illustrated in the size analysis of the calciner discharge materials.

|  | free moisture | approximate size | Calcination losses | sticking | conversion |
|---|---|---|---|---|---|
| Blended feed | 19% | 320 micron crystals | 60% | some | 88% |
| Pelletised feed | 13% | 7 mm diameter | <1.5% | none | 85% |
| Pelletised feed | 0% | 7 mm diameter | <2.5% | none | 87% |

| | Sieve Analysis of Calcined Product | | |
|---|---|---|---|
| | >1.18 mm | 150 micron - 1.18 mm | <150 micron |
| Blended feed | 23% | 21% | 56% |
| Pelletized feed | 99% | <1% | <1% |
| Pelletized feed | 99% | <1% | <1% |

What is claimed is:

1. A process for the production of calcinable gypsum which comprises agitating a mixture of damp gypsum containing from 15 to 25 weight percent of water with a carbonaceous reducing agent to form pellets, and when moisture is observed at the surface of the forming pellets, adding thereto a substantially dry mixture of a powder compound of calcium and a carbonaceous reducing agent until the forming pellets are coated with the powdered mixture and are free flowing.

2. A process according to claim 1 in which the a damp gypsum contains from 18 to 22 weight percent of water.

3. A process according to claim 1 in which the reducing agent is coke.

4. A process according to claim 3 in which the amount of coke is from 2 to 8 percent by weight of the damp gypsum.

5. A process according to claim 1 in which the compound of calcium is selected from the group consisting of calcium carbonate, calcium sulphate hemi-hydrate, calcium oxide, calcium sulphide, partly calcined calcium sulphate and dry gypsum.

6. A process according to claim 1 in which the damp gypsum is agitated in a horizontal pan-shaped mixer equipped with an internal offset paddle and scraper bar.

7. A process according to claim 1 in which the damp gypsum is agitated in a horizontal cylindrical-like trundler.

8. A process according to claim 7 in which the damp gypsum is fed continuously into one end of the horizontal cylindrical-like trundler and dry powdered gypsum is fed to the trundler at a position along the length of the trundler where moisture is observed at the surface of the forming pellets to form the coated pellets which issue from the other end of the trundler.

* * * * *